United States Patent
Sankey et al.

(10) Patent No.: US 6,578,153 B1
(45) Date of Patent: Jun. 10, 2003

(54) SYSTEM AND METHOD FOR COMMUNICATIONS LINK CALIBRATION USING A TRAINING PACKET

(75) Inventors: Wayne Robert Sankey, Plano, TX (US); Kyl Scott, Richardson, TX (US); Osman Koyuncu, Plano, TX (US); Kam-Wing Li, Richardson, TX (US); Ritesh Dhirajlal Sojitra, Dallas, TX (US)

(73) Assignee: Fujitsu Network Communications, Inc., Richardson, TX (US)

( * ) Notice: Subject to any disclaimer, the term of this patent is extended or adjusted under 35 U.S.C. 154(b) by 0 days.

(21) Appl. No.: 09/527,323

(22) Filed: Mar. 16, 2000

(51) Int. Cl.[7] ............................. H04L 7/00; G06F 13/38
(52) U.S. Cl. ........................................ 713/400; 710/71
(58) Field of Search .................... 713/400, 600; 710/71; 370/464

(56) References Cited

U.S. PATENT DOCUMENTS

| | | | |
|---|---|---|---|
| 5,253,254 A | * 10/1993 | Roberts et al. | 375/368 |
| 5,426,784 A | * 6/1995 | Kawata et al. | 713/600 |
| 5,455,830 A | 10/1995 | Gregg et al. | 371/1 |
| 6,031,767 A | 2/2000 | Schuh et al. | 365/189.05 |
| 6,134,247 A | * 10/2000 | Solana de Quesada et al. | 370/516 |

FOREIGN PATENT DOCUMENTS

WO    WO 98/37494    8/1998    ........... G06F/13/40

OTHER PUBLICATIONS

International Search Report in International Application No. PCT/US 01/08226, dated May 7, 2002, 6 pages.

* cited by examiner

*Primary Examiner*—Thomas Lee
*Assistant Examiner*—Suresh K Suryawanshi
(74) *Attorney, Agent, or Firm*—Baker Botts L.L.P.

(57) ABSTRACT

In one aspect, the present invention provides a method of communicating across a serial line 26. In this method, n parallel streams of data 30 are to be received at a destination 20. In a first embodiment, the n parallel streams of data 30 characterized in that one of streams of data includes a unique characteristic that can be used to distinguish that one from each of the other streams of data. In a second embodiment, each of the n streams of data 30 are in a particular pattern that includes a detectable characteristic. At the destination 20, the unique characteristic and/or detectable characteristic can be detected to correct space and/or time errors in the streams of data. For example, the destination 20 might be a receiver that includes a serial-to-parallel converter 28 and calibration circuitry 34.

43 Claims, 6 Drawing Sheets

SYSTEM AND METHOD FOR COMMUNICATIONS LINK CALIBRATION USING A TRAINING PACKET

FIELD OF THE INVENTION

This invention relates generally to communications link calibration and specifically to a system and method for communications link calibration using a training packet.

BACKGROUND OF THE INVENTION

The present invention is applicable in any field where high speed data transfer occurs such as telecommunications, data communications, high speed computing and disk drives. In these types of systems, it is often necessary to transfer data across a communications link that operates at a higher speed than the receiver interface. One way to accomplish this goal while maintaining the same level of bandwidth is to use parallel communications links at a slower speed. For example, assume the first data rate is four times greater than the second data rate. In that case, using four parallel links at the lower rate will provide equivalent bandwidth to one link at the higher rate.

Serial-to-parallel converters that perform this demultiplexing function are known in the art. These converters include circuitry that transfers each serial bit to one of a number of parallel outputs. These parallel outputs can be provided to additional circuitry in the system. Such a configuration is shown in FIG. 1, which includes serial-to-parallel converter 10 and processing circuitry 12.

To ensure that processing circuitry 12 is receiving valid data from serial-to-parallel converter 10, a calibration sequence can be used. In this example, controller 14 issues commands to stop communication and begin the calibration sequence. A known sequence can then be provided to the input line of the serial-to-parallel converter 10. Processing circuitry 12 can look for this known sequence and make any necessary adjustments in order to correct for errors.

This solution, however, is not ideal since it requires that communications between serial-to-parallel converter 10 and processing circuitry 12 be shut down during the calibration process. In some applications, such as in telephone or data networks, this requirement may not be acceptable.

SUMMARY OF THE INVENTION

The present invention provides an improved system and method for calibrating a serial to parallel link. The preferred embodiment uses a training packet. Training packets allow a handshake free method to correct for logical versus physical link effects. These effects might include data structure independent demultiplexing and timing or "bit slips" amongst multiple physical links.

In a first aspect, the present invention provides a method of correcting space errors in a plurality of parallel data streams. In this method, n streams of parallel data are received, for example, at a receiver in a fiber optic transmission system. The receiver circuitry searches through the n streams of parallel data to detect a unique characteristic that is possessed by one of the streams of data but not any of the other streams of data. Based on this unique characteristic, one of the streams of data is assigned to a particular bit position within n bit positions. The other streams of data can the be assigned different ones of the n bit positions.

This aspect of the present invention is useful to simplify the framing process. Space errors can be caused, for example, by the conversion of serial data into parallel data. Using this technique provides a simple and inexpensive way to detect word boundaries in that situation.

In another aspect of the present invention, time errors (e.g., bit position errors) can be corrected in a plurality of parallel data streams. In this method, n streams of parallel data are received, possibly from circuitry that has already performed word alignment as described above. Each of the streams is in a particular pattern. For each of the n streams of parallel data, a characteristic, e.g., a pattern change such as a transition, is detected in the particular pattern and, using this characteristic, the n streams can be re-timed relative to one another.

Various aspects of the present invention include a number of advantages over prior art techniques. For example, the present invention can be implemented in a uni-directional or bi-directional channel. No network control is required. In addition, the method can be implemented in a way that is handshake free. This technique can also be easily extended to include links with parity bits.

Aspects of the method are advantageous because the framing process is simplified and there is no need to shut down then communications link when the method is used. This packet has use in a great number of applications. One prime example is in dense wavelength division multiplexed (DWDM) system where the bandwidth across the fiber is very high.

The preferred embodiment of the present invention is also very inexpensive in terms of system bandwidth. For example, in some applications much less than 0.001% of the total available bandwidth will be consumed by the training packet. In addition, in this embodiment the link remains operational when being trained.

BRIEF DESCRIPTION OF THE DRAWINGS

The above features of the present invention will be more clearly understood from consideration of the following descriptions in connection with accompanying drawings in which.

DETAILED DESCRIPTION OF ILLUSTRATIVE EMBODIMENTS

The making and use of the various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

Figure 1:
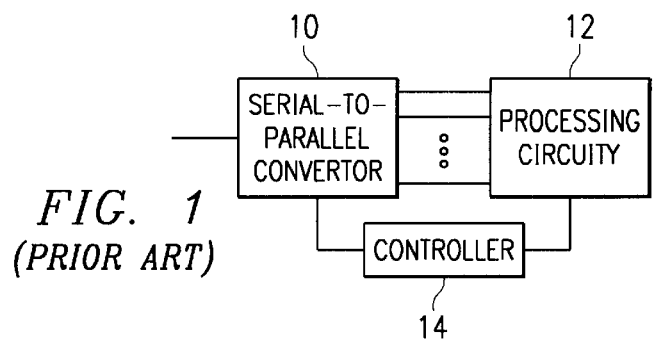
FIG. 1 is a prior art data processing system.
Figure 2:
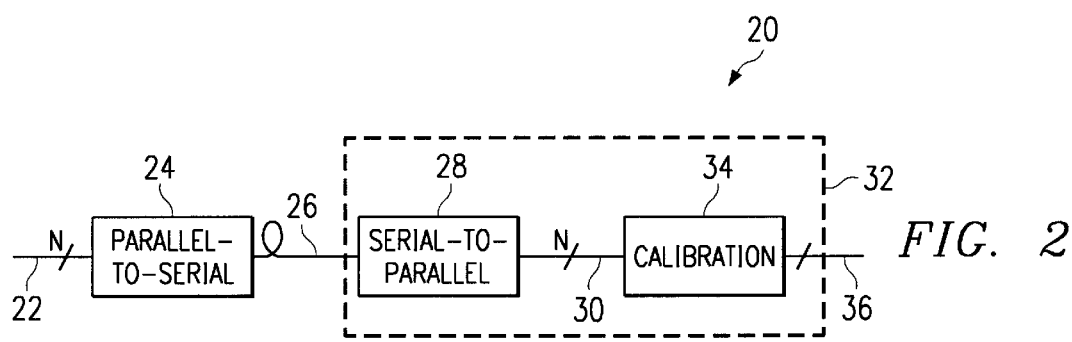
FIG. 2 shows a transmission system that can utilize the present invention.

In one aspect, the present invention relates to the manipulation of parallel streams of data. This invention can be used, for example, in applications where parallel data is serialized and then returned to parallel form. One such example is in communications systems. For instance, FIG. 2 illustrates a transmission system where n parallel data streams 22 are combined or multiplexed, for example in a parallel-to-serial converter 24, to form a serial data stream 26.

In this example, the serial data stream 26 is transmitted to a receiver 32 along a fiber optic line. At the receiver 32, the serial data stream 26 is converted back into parallel data 30 by a serial-to-parallel converter 28. Table 1 illustrates the three data streams for an ideal case.

TABLE 1

| n Parallel Data Streams 22 | Serial Data Stream 26 | n Parallel Data Streams 30 |
|---|---|---|
| $a_2\ a_1\ a_0$ | $x_2\ ...\ b_1\ a_1\ x_0\ ...\ b_0\ a_0$ | $a_2\ a_1\ a_0$ |
| $b_2\ b_1\ b_0$ | | $b_2\ b_1\ b_0$ |
| . | | . |
| . | | . |
| . | | . |
| $x_2\ x_1\ x_0$ | | $x_2\ x_1\ x_0$ |

In this nomenclature, each of the n parallel data streams 22 is symbolized by a letter (a, b, etc.) Accordingly, "$a_2\ a_1\ a_0$" is the first data stream and "$x_2\ x_1\ x_0$" is the $n^{th}$ data stream. In a typical application, bits in the first data stream would correspond to the most (or least) significant bit in an n-bit word. The subscripts indicate time delays based on an arbitrary time source. So, in this case, bit 0 is transmitted before bit 1.

As shown in Table 1, in an ideal case, the parallel data stream 30 is an identical replication of parallel data stream 22. Unfortunately, due to a number of factors, this may not be the case. For example, space errors occur when it is not clear which bit in the serial stream belongs in the "first" of the parallel streams 30. This type of error is illustrated in Table 2, where n=4.

TABLE 2

| Parallel Data 22 | Serial Data 26 | Parallel Data 30 |
|---|---|---|
| $a_2\ a_1\ a_0$ | $d_2\ c_2\ b_2\ a_2\ d_1\ c_1\ b_1\ a_1\ d_0\ c_0\ b_0\ a_0$ | $c_2\ c_1\ c_0\ c_{-1}$ |
| $b_2\ b_1\ b_0$ | | $d_2\ d_1\ d_0\ d_{-1}$ |
| $c_2\ c_1\ c_0$ | | $a_3\ a_2\ a_1\ a_0$ |
| $d_2\ d_1\ d_0$ | | $b_3\ b_2\ b_1\ b_0$ |

In this case, the bit labeled "c" appears to be the most (or least) significant bit even though it is not. This type of error is referred to as a space error since the data bits are being carried on the wrong physical conductor. It is also noted that the demultiplexer also created a timing error since $a_0$ and $b_0$ arrive one clock cycle earlier than $c_0$ and $d_0$.

Table 3 provides a more general illustration of time errors, which in some cases might be bit position errors or bit slipping. In this case, the timing of each of the bits is misaligned relative to one another. This type of error can occur, for example, in very high speed applications where the delay varies for different bits.

TABLE 3

| Parallel Data 22 | Serial Data 26 | Parallel Data 30 |
|---|---|---|
| $a_2\ a_1\ a_0$ | $d_2\ c_2\ b_2\ a_2\ d_1\ c_1\ b_1\ a_1\ d_0\ c_0\ b_0\ a_0$ | $a_1\ a_0\ a_{-1}$ |
| $b_2\ b_1\ b_0$ | | $b_2\ b_1\ b_0$ |
| $c_2\ c_1\ c_0$ | | $c_1\ c_0\ c_{-1}$ |
| $d_2\ d_1\ d_0$ | | $d_0\ d_{-1}\ d_{-2}$ |

In this example, assume that the timing of bit streams "a" and "c" are "correct." (As examples, the correct timing can be determined from existing knowledge of the assumed delays of the system or by arbitrarily defining one of the bit streams as being correct.) If so, bit stream "b" arrived one time delay early (a negative bit position error) and bit stream "d" arrived one time delay late (a positive bit position error).

It is noted that the present invention would work just as well if the time errors are generated at the transmitter. For example, Table 4 shows an example where the parallel data is already misaligned before being converted into serial data. For purpose of illustration, parallel data 30 is further misaligned. The preferred embodiment of the present invention, can be used to correct both of these misalignments simultaneously.

TABLE 4

| Parallel Data 22 | Serial Data 26 | Parallel Data 30 |
|---|---|---|
| $a_1\ a_0\ a_{-1}$ | $d_3\ c_2\ b_0\ a_1\ d_2\ c_1$ | $a_1\ a_0\ a_{-1}$ |
| $b_0\ b_{-1}\ b_{-2}$ | $b_{-1}\ a_0\ d_2\ c_0\ b_{-2}\ a_{-1}$ | $b_2\ b_1\ b_0$ |
| $c_2\ c_1\ c_0$ | | $c_1\ c_0\ c_{-1}$ |
| $d_3\ d_2\ d_1$ | | $d_0\ d_{-1}\ d_{-2}$ |

In the preferred embodiment, the present invention provides a method to correct both space and time errors using a single training packet or training frame. Throughout this description, the term "training packet" is used since in the preferred embodiment the training sequence exists at the network layer by virtue of conforming to the hardware packet format (e.g., transport label, etc.). This is not required however. For example, the training sequence can be built directly into the Modified-SDL protocol. It should therefore be understood that the term training packet is intended to encompass training frames (e.g., at the data link layer) or training packets (e.g., at the network layer) or other data sequences at other layers.

In FIG. 2, this method can be implemented by calibration circuitry 34. As will be described in more detail, the preferred embodiment uses a training packet that can be detected by the receiver 32 and used to calibrate the system, thereby avoiding both space and time errors. It is noted that while the preferred embodiment envisions implementation of both space and time error correction, either of these could be implemented without the other. Either of these embodiments could also utilize a parity channel.

In some implementations, there may be overlap between the space error correction phase and the time error correction phase. This will be determined in large part by the hardware design. It might also be desirable to include additional bits after correcting for time errors in order to fill the pipelines with known values. This goal can be accomplished at no cost in embodiments that require padding to find a proper word boundary.

The present invention will now be described in the context of a specific application. This exemplary embodiment is useful to illustrate several of the concepts that could be incorporated.

Figure 3:
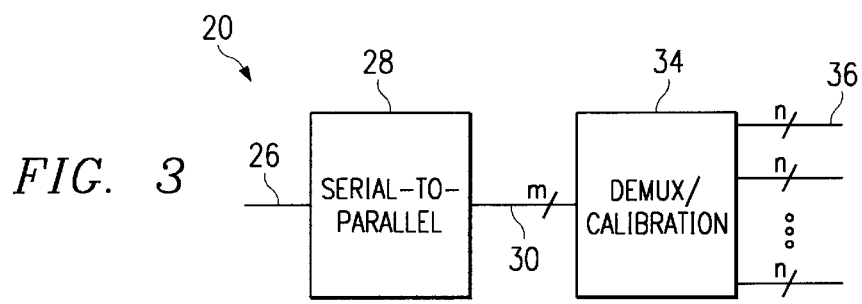
FIG. 3 shows a simplified block diagram of a receiver.

FIG. 3 illustrates a receiver 20 that is similar to the receiver of FIG. 2. In this case, however, circuitry 34 also performs a second (optional) demultiplexing process. The second demultiplexing process can be used, for example, when the lines 30 operate at speeds too high for downstream circuitry. In all, circuitry 28 demultiplexes one serial line 26 into m parallel lines and circuitry 34 demultiplexes each of the m parallel lines into n more parallel (for a total of m×n lines).

The concepts would apply if line 26 included more than one line. For example, sixteen links could be multiplexed down to four links and then demultiplexed back to sixteen links. A training packet of the present invention could be implemented to calibrate the 4:16 demultiplexer, formed from the four 1:4 demultiplexers.

In the preferred embodiment of the present invention, a training packet is sent from transmitter 24 (FIG. 2) to receiver 20 and is used to calibrate transmissions received at path 36. The training packet is any special packet that can resolve ambiguities about the signaling.

The following description provides the details for one particular design that utilizes aspects of the present invention. In this description, a number of definitions are used. In this discussion, M is the high-speed demultiplexing ratio (e.g., the ratio of the number of lines 30 to the number of lines 26). N is the low-speed demultiplexing ratio (e.g., the ratio of the number of lines 36 to the number of lines 30). E is the maximum bit position error, relative to a perfect source. The maximum bit position error E has two components—EP is the maximum positive bit position error (time delay) and EN is the maximum negative bit position error (time advancement).

Using these variables, the length of a training pattern within a training packet can be determined. In the embodiment discussed below, in order to completely fill the N-bit serial-to-parallel outputs with known data the packet includes N+EP+EN+1 bits for each of the M inputs. Also, in order to locate a single known transition (after word alignment has been completed) an EN+EP+1 bit sequence is used with a EN+EP+1 bit inspection window. It is noted that the second sequence may partially overlap the first, depending on the specific hardware implementation.

In a typical optical transmission system, the bit position error E due to electrical path differences, jitter, retiming, and others can be estimated (and empirically tested). For purposes of the illustrative example, it is assumed that EP is chosen to be 7 and EN is chosen to be 4. These parameters can be determined by reviewing things such as board level tolerances and retiming provided by the hardware design. It should also be taken in consideration if the method used to perform word alignment adds any delay cycles to some bits and how much delay will be added by the low-speed demultiplexers. M and N are determined by the system requirements and hardware design.

In order to correct for space errors, the training packet is configured such that one of the data streams possesses a unique characteristic that is not possessed by any of the other streams of data. This unique characteristic may be contained entirely within the stream or might be discernable only by viewing the stream in relation with another stream or streams or a combination of both. Circuitry at the receiver can search out that stream with the unique characteristic and assign it to the proper bit position. Since the bits were transmitted serially, the remainder of the bits can be easily assigned.

As will be shown in the examples below, the unique characteristic can take on a number of forms. In the simplest case (from an implementation standpoint), the unique characteristic is determined relative to another one of the parallel data streams. As a first example, one stream could be all "0's" (or all "1's") and all other streams could be all "1's" (or all "0's"). This case would be especially simple if each stream was only one bit long.

As another example, two adjacent bit streams will have all "0's" (or all "1's"). Accordingly, one of the bit streams will have the unique characteristic that it is adjacent to another stream that has bits with all the same values. A detailed implementation of this case will be described below with respect to Table 5 and FIGS. 4–9.

In an alternative embodiment, the unique characteristic can be a unique bit pattern within one of the streams of data. In that example, the circuitry at the receiving end can examine each incoming bit stream to determine which one has the unique pattern. An example of this type of code is described below with respect to Table 7.

In one case, each of the bit streams could have a unique pattern relative to all of the other bit streams. In this manner, the bit streams could be sorted out even they had not been transmitted serially. In other words, each of the bits could be sent out in a random (but consistent) order and they could still be properly assigned at the output.

For some systems, an additional set of constraints on the training packet is that both the high-speed link and the M demultiplexed inputs should maintain a sufficient bit transition density to satisfy optical transmission requirements and the digital clock recovery (DCR) requirements. As is known, the transition density is the number of transitions from "1" to "0" and from "0" to "1". Also, the training packet should be recognizable as such with a very low probability of aliasing while in training mode.

It is noted that many codes meet these requirements. A first embodiment training sequence format is shown in Table 5. This sequence was derived for the case where M=16, N=4, EP=7 and EN=4. As shown above in Table 1, the order of bits on the serial line 26 is the first bit for input 0, followed by the first bit for input 1, etc. until the last bit of input 15 is sent.

TABLE 5

| M Inputs | Phase 1 - Space Error N + EP + EN + 1 (16 Bits) | Phase 2 - Time Error EP + EN + 1 (12 Bits) |
|---|---|---|
| 0 | 0000 0000 0000 0000 | 0000 0000 0001 |
| 1 | 0000 0000 0000 0000 | 0000 0000 0001 |
| 2 | 1111 1111 1111 1111 | 1111 1111 1110 |
| 3 | 0000 0000 0000 0000 | 0000 0000 0001 |
| 4 | 1111 1111 1111 1111 | 1111 1111 1110 |
| 5 | 0000 0000 0000 0000 | 0000 0000 0001 |
| 6 | 1111 1111 1111 1111 | 1111 1111 1110 |
| 7 | 0000 0000 0000 0000 | 0000 0000 0001 |
| 8 | 1111 1111 1111 1111 | 1111 1111 1110 |
| 9 | 1111 1111 1111 1111 | 1111 1111 1110 |
| 10 | 0000 0000 0000 0000 | 0000 0000 0001 |
| 11 | 1111 1111 1111 1111 | 1111 1111 1110 |
| 12 | 0000 0000 0000 0000 | 0000 0000 0001 |
| 13 | 1111 1111 1111 1111 | 1111 1111 1110 |
| 14 | 0000 0000 0000 0000 | 0000 0000 0001 |
| 15 | 1111 1111 1111 1111 | 1111 1111 1110 |

The code shown in Table 5 includes 28 bits for each of the M inputs. The first sixteen bits (phase 1) are used to correct space errors. If all that is desired is to correct space errors then the final twelve bits are not necessary. To use this code, the receiver would search for the consecutive "0's" and determine that these belonged to inputs 0 and 1. (Just as easily, the receiver could search for consecutive "1's" and determine that these belong to inputs 8 and 9.) From this information, the location of all additional bits can be determined.

The last twelve bits are used to correct time errors. To use this code, the transition in the pattern is detected for each input. Since this transition occurs at the same time at the transmitter side, the bits can be realigned based on the transition. In this manner, the parallel streams of data can be re-timed relative to one another based on the detection of the transition. The leading bits are provided to be sure that the appropriate bits leave all been received before searching for the transition.

While the illustrative example searches for a transition, it is noted that other characteristics can be used. The only limitation is that the characteristic be able to linked with a time relative to another data stream. Another example of a possible characteristic is a pattern change, for instance "1010 1010 1010 0101". Another characteristic might be a specific bit pattern. For example, the receiver might search for consecutive "1's" in the patterns "1010 1010 1101" or "0101 0100 1101" (or any of an infinite number of other patterns).

Table 6 illustrates a full training packet sequence that could be utilized in a Internet Protocol Transport (IPT) transmission system. In this packet, there are an additional 128 bits of overhead due the 32-bit Modified-SDL (simple data link) header, the 32-bit Modified-SDL Packet CRC (cyclical redundancy code), the 32-bit Hardware Format Transport Label and 32 bits of padding (for overall 64 bit packet alignment). The overall packet length is then 128+M((N+EP+EN+1)+(EP+EN+1)) or, for this example, 576 bits (72 bytes).

circuit that receives M parallel inputs (e.g., from a serial-to-parallel converter) and generates M×N parallel outputs. In the specific example shown (as in the table), M is equal to 16 and N is equal to 4.

Figure 10:
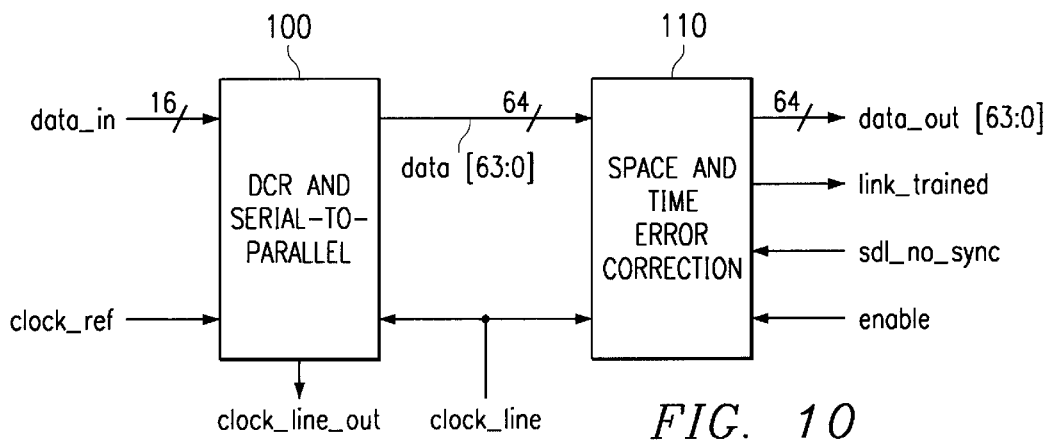
FIG. 10 is a block diagram of a 16-bit to 64-bit converter.

FIG. 10 provides an overview of the system. Digital clock recovery and serial-to-parallel converter block 100 receives 16 bits of parallel data labeled data_in (e.g., provided at a rate of 622 MHz). This block 100 also receives a reference clock clock_ref (e.g., operating at 155 MHz). Block 100 outputs 64 bits of parallel data labeled data [63:0] and a clock labeled clock_line_$_{out}$.

The 64 data streams data [63:0] and the clock clock_line_out are provided to space and time error correction circuitry 110. Block 110 also receives an enable signal enable and a control signal sdl_no_sync that indicates that the system has determined that calibration is necessary (e.g., higher level framing errors are present). This circuitry 110 provides 64 bits of corrected data labeled data_out [63:0]. Control signal link_trained indicates that the calibration has been successfully performed.

Figure 4:
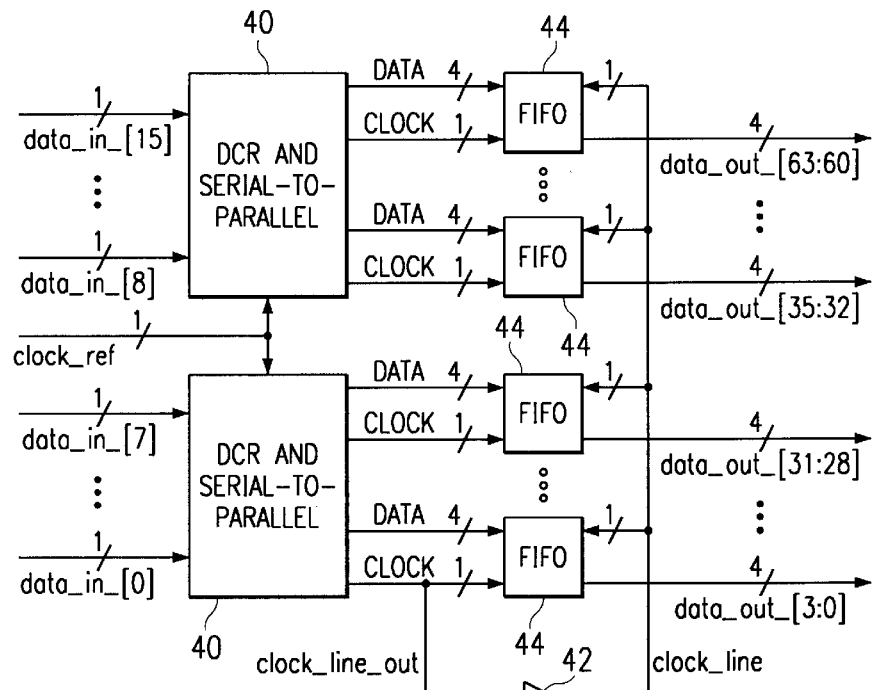
FIG. 4 is a block diagram of a digital clock recovery and serial to parallel converter circuitry.
Figure 6A:
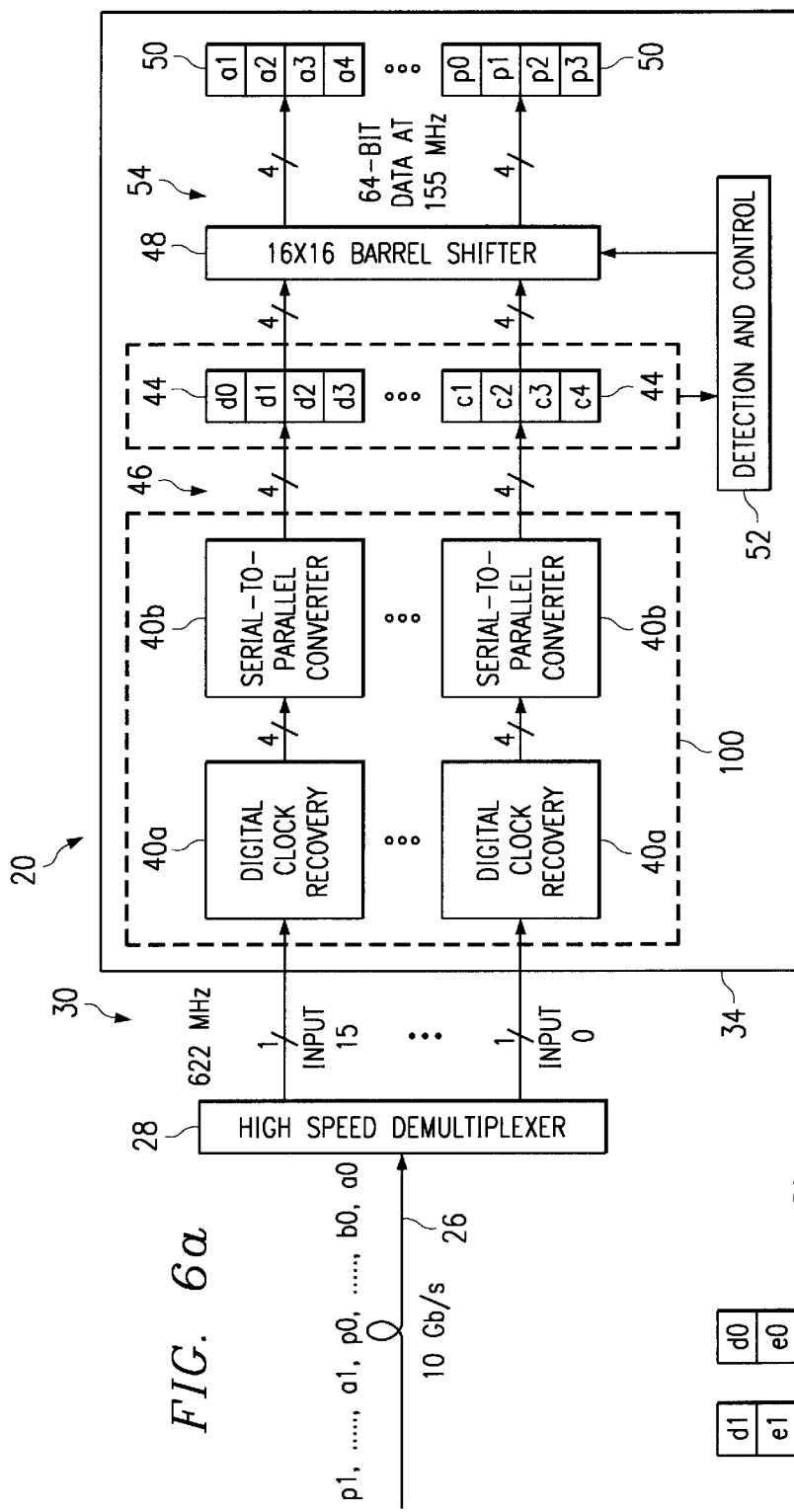
FIG. 6 is a block diagram of the circuitry of FIG. 5 but has been labeled to explain an exemplary method of operation.
Figure 6B:
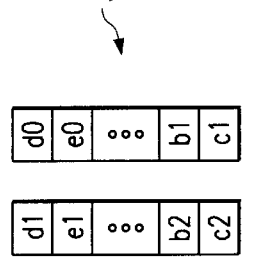
Figure 7:
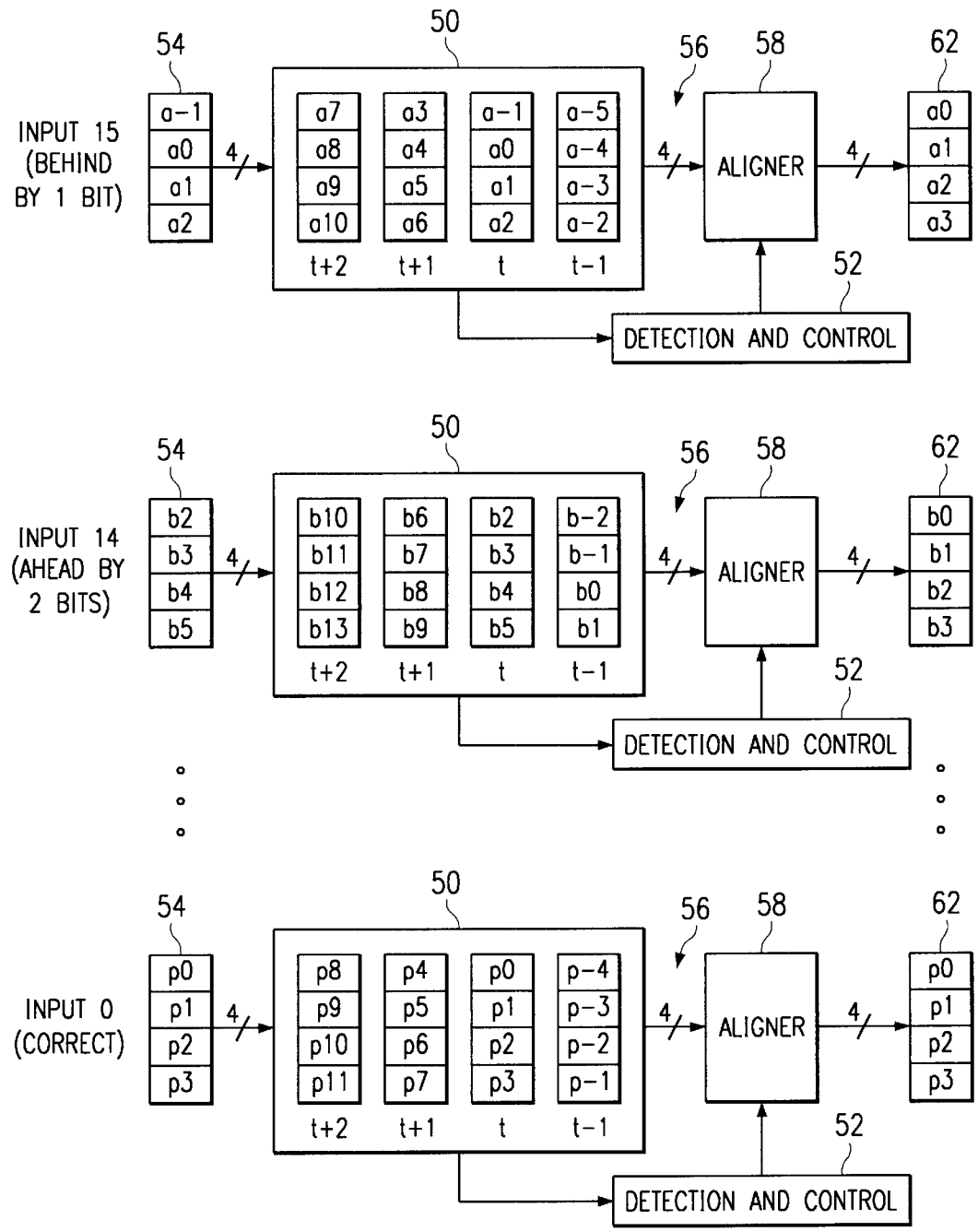
FIG. 7 is a block diagram of bit alignment circuitry.
Figure 8:
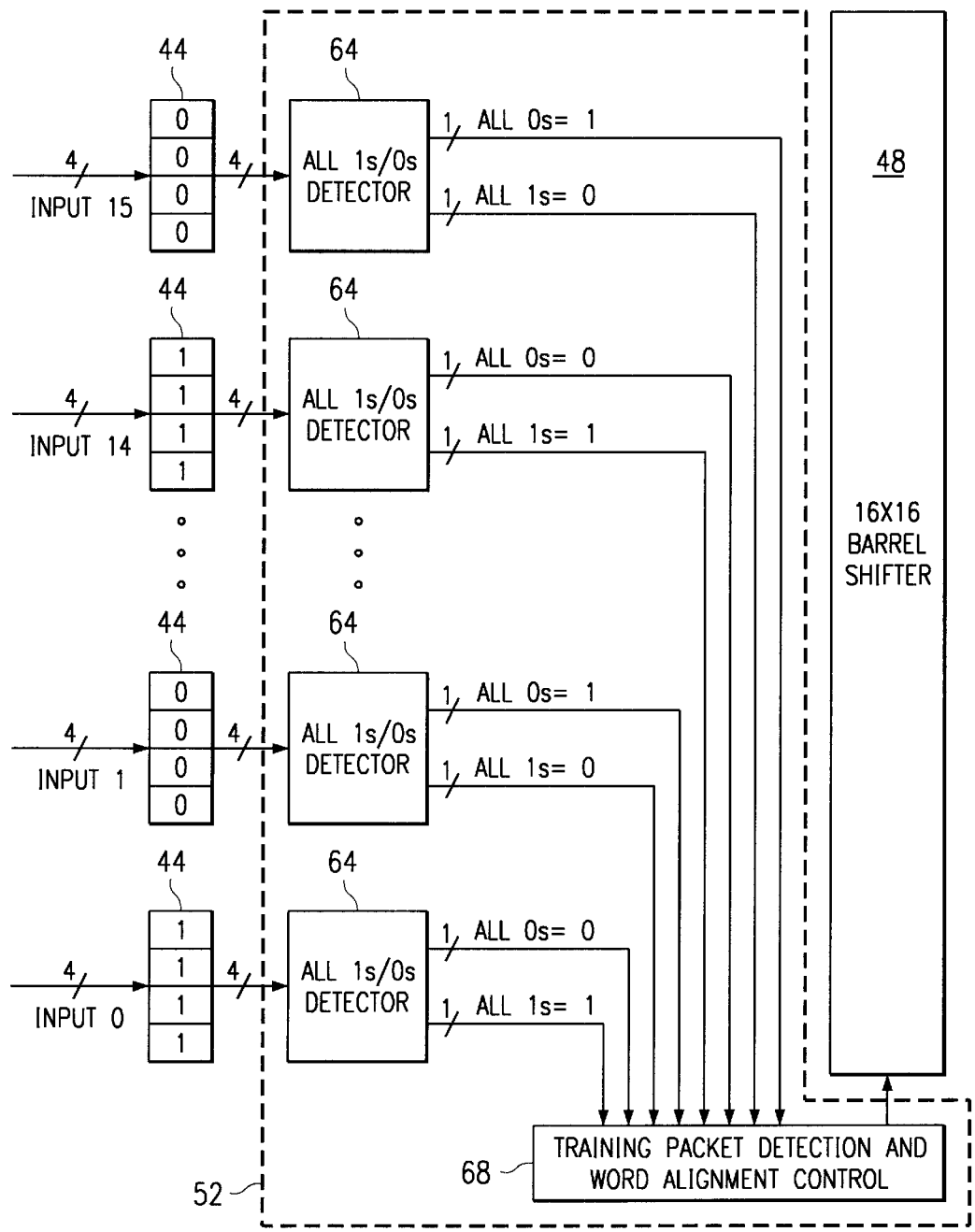
FIG. 8 is a block diagram showing a specific implementation of word alignment detection circuitry.
Figure 9:
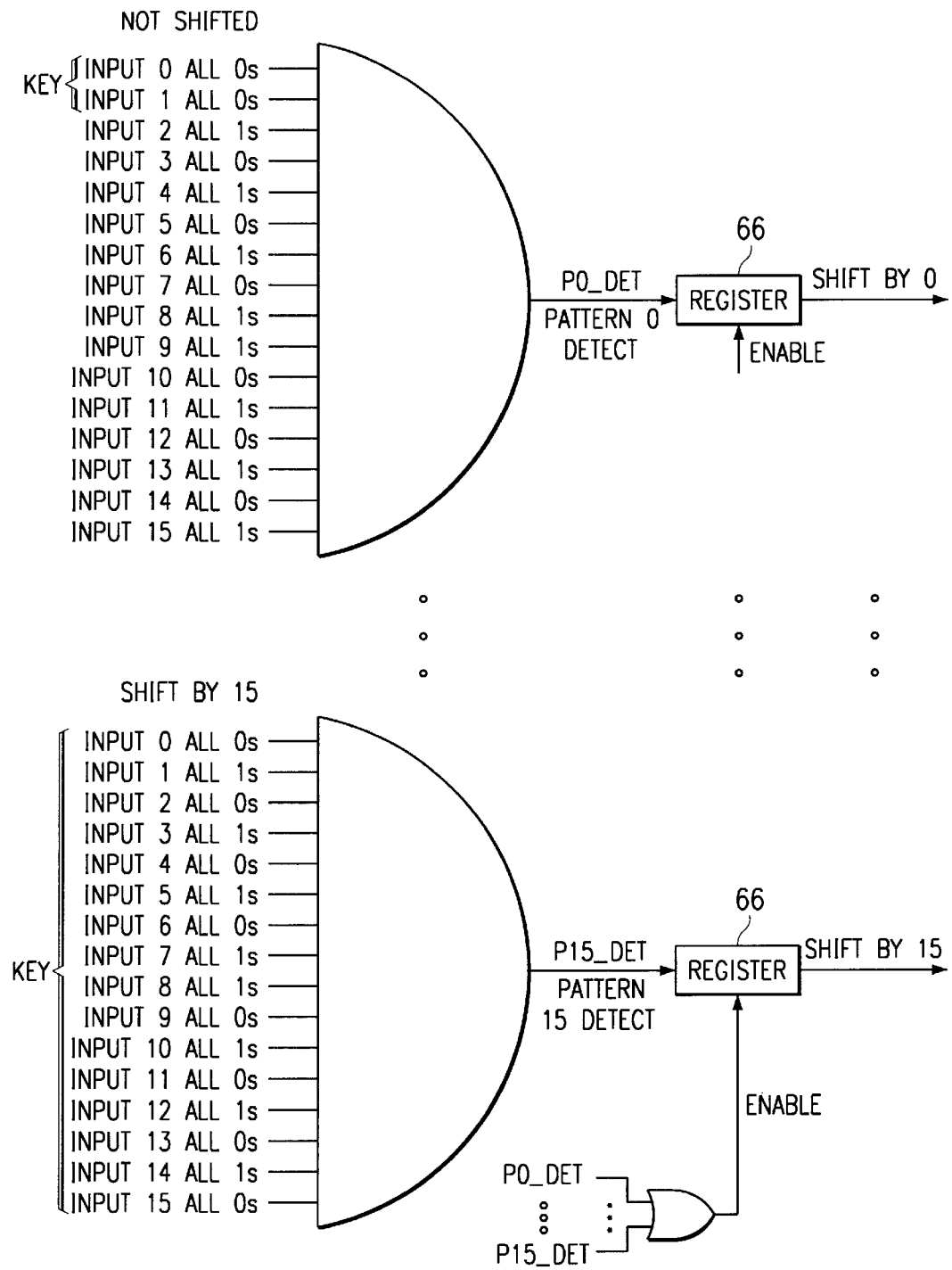
FIG. 9 is a block diagram showing a specific implementation of training packet detection and word alignment control.

A more specific implementation of the blocks in FIG. 10 are shown in FIGS. 4–9. FIG. 4 shows the block 100. Space and time error correction block 1 10 is spread across FIGS. 5 and 7, with FIG. 5 focusing on space correction and FIG. 7 on time correction. FIG. 6 is provided to demonstrate how the space correction operates. Finally, FIGS. 8 and 9 provide a lower level of detail of the correction circuitry.

As shown in FIG. 4, the circuit 100 includes a demultiplexer circuit 40 that converts the sixteen parallel inputs labeled data_in [0] through data_in [15] into 64 bits labeled data_out [63:0] (16×4=64). In the preferred embodiment, the demultiplexers are implemented using two RX5GIG

TABLE 6

| Description | Data (64 Bits) | | | | | | | |
|---|---|---|---|---|---|---|---|---|
| Modified-SDL Header and Hardware Transport Label | 00 | 44 | 79 | CD | E0 | 05 | AE | 01 |
| Training Sequence | 2A | D5 | 2A | D5 | 2A | D5 | 2A | D5 |
| Training Sequence | 2A | D5 | 2A | D5 | 2A | D5 | 2A | D5 |
| Training Sequence | 2A | D5 | 2A | D5 | 2A | D5 | 2A | D5 |
| Training Sequence | 2A | D5 | 2A | D5 | 2A | D5 | 2A | D5 |
| Training Sequence | 2A | D5 | 2A | D5 | 2A | D5 | 2A | D5 |
| Training Sequence | 2A | D5 | 2A | D5 | 2A | D5 | 2A | D5 |
| Training Sequence | 2A | D5 | 2A | D5 | 2A | D5 | D5 | 2A |
| 4 Bytes Padding and Packet CRC | 55 | AA | 55 | AA | F0 | 85 | 53 | CF |

The actual training packet for this specific implementation is made up of an SDL header, a transport label, the training sequence, the padding and the packet CRC.

An optional third phase of the training process is to resolve time errors in the parity channel(s). This can be done in an indirect manner by manipulating the patterns on the data channels to produce a characteristic in the parity stream(s), such as a transition. The normal time error correction process then ensues for the parity channel(s). Note that in some applications the parity data may be delayed from the data that generated it, and the hardware would account for this delay. Depending on the application, the time error correction process can remove this delay, if so desired. Typically however, it will be preserved to allow time for the internal parity generation to calculate the received parity check values.

Figure 5:
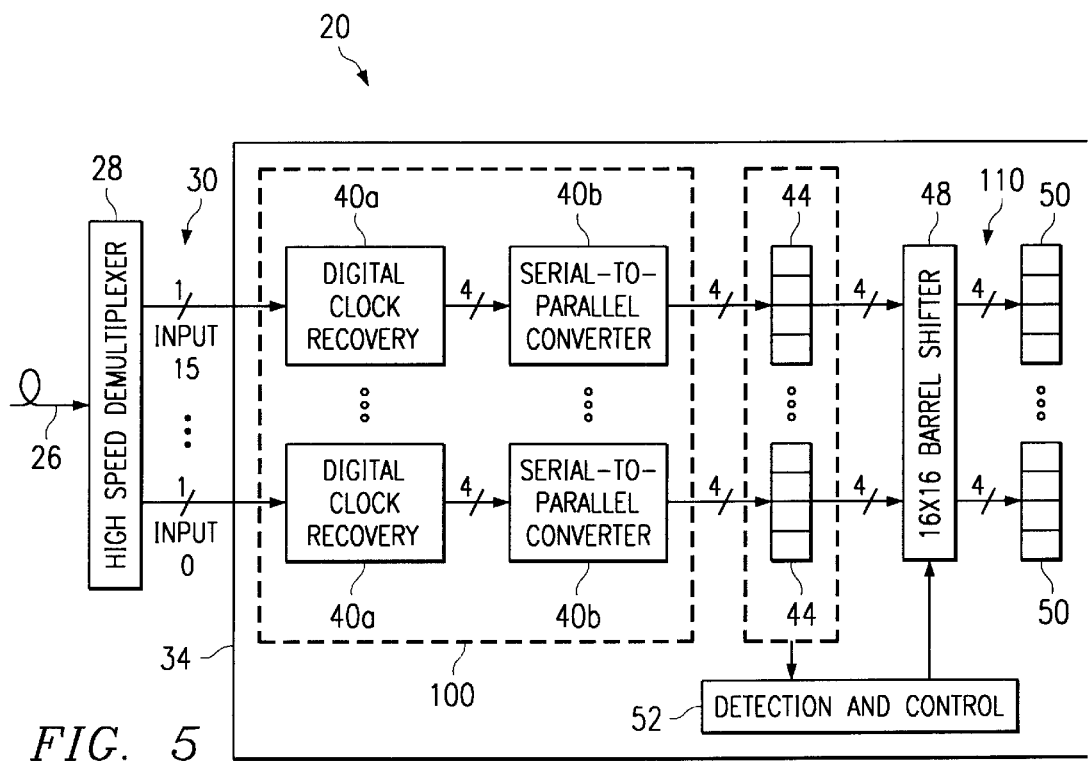
FIG. 5 is a block diagram of word alignment circuitry.

FIGS. 4–10 provide a detailed description of a hardware implementation of training packet sequence as shown in Table 5 (and/or Table 6). In the preferred embodiment, the circuit in FIGS. 5 and 7 is implemented in a single integrated Megamodules available from Texas Instruments Incorporated. These modules can be implemented, for example, in an ASIC design.

The modules 40 also perform clock recovery based on the incoming data streams. These modules regenerate both clock and data from the input LVDS (Low Voltage Differential Signals) data stream. The megamodules receive a reference clock clock_ref (e.g., at 155 MHz) and extract a line clock clock_line_out (e.g., also at 155 MHz) from the first data input which is buffered via buffer 42 outside of this block and is then used as clock_line for downstream processing. The megamodule data outputs data_out [63:0] are retimed to the recovered line clock clock_line.

In this design, sixteen small FIFOs 44 are used to re-time the sixteen separately recovered data inputs to the arbitrarily chosen line reference clock clock_line. All sixteen inputs have the same average frequency but can have different phases. A small register based FIFO should be sufficient as both the read and write clocks are frequency locked.

FIGS. 5 and 7 illustrate a preferred embodiment of receiver circuitry 20. Receiver 20 receives serial data from link 26. In one example, link 26 is a 10 Gb/s optical fiber. High speed demultiplexer 28 converts the 10 Gb/s link to sixteen links 30 operating at 622 MHz. These sixteen links are input into digital clock recovery and serial-to-parallel converter circuitry 100. This circuitry provides 64 bits of data to FIFOs 44.

This block uses a special training sequence (or training packet) to identify time errors (e.g., leading/lagging bit relationships) between the various data inputs, and to perform space alignment on the sixteen four-bit serial-to-parallel converter's outputs 46. In this example, the training packet provides interleaved patterns that are received by each digital clock recovery circuit 40. These codes are recognized and used to insert a delay into each serial-to-parallel path in order to align the bits in each clock cycle of clock_line.

Additionally, the unique characteristic of the code is used to word align the serial-to-parallel converter's outputs 46, since the 1-to-16 high-speed demultiplexing (at block 28) is performed without regard to byte boundaries. This training function is enabled when the system recognizes that the bits are not synchronized (control signal sdl_no_sync). The circuit will then notify the system after detecting a training packet and completing training (control signal link_trained).

To reduce the likelihood of aliasing, the training search can be enabled only when not in Modified-SDL frame. If all M inputs are checked during step 1, then there is a 16 in $2^{MN}$ (e.g., 1 in $2^{60}$) chance of aliasing which is reasonably small, since there is only a two packet opportunity for damaging aliasing to occur. In the event that aliasing occurs before the real training packet is received, no additional data is lost (since the system wasn't trained and will not train correctly until the real training packet is received).

There is a two packet window of vulnerability after a correct training packet is received and before the Modified-SDL framer has synchronized (which disables the training circuitry). If an aliased packet were received in this two packet window, it would delay the training process until the next correct training packet was received. The worst case probability is when two maximum length packets (1536 bytes) are involved, and is roughly one failure every $3\times10^{15}$ times trained. Once the link is trained, the training circuitry is disabled (as long as Modified-SDL frame synchronization is maintained), so aliasing is no longer an issue.

Two distinct alignment steps are implemented by detection and control circuitry 52. In the first, the M-bit (16-bit) words are aligned in space. Space alignment refers to locating the proper 16-bit word boundary. The high-speed demultiplexers 28 performs a simple 1:16 demultiplexing function without knowledge of the data content or framing. Thus, the first bit of a 16-bit word could occur on any one of the sixteen high-speed data inputs 30. A simple, but unique, pattern of data in the first phase of the training packet allows the determination of where the 16-bit word starts. Because of the additional frequency down conversion from 16 bits at 622 MHz to 64 bits at 155 MHz that occurs in the block 40, the proper 64-bit word alignment is also necessary for this implementation. This alignment is performed during the time error correction or time alignment step by virtue of referencing the time error correction pattern with respect to the 64-bit Modified-SDL packet boundary. The space alignment can be implemented using barrel shifter 48, which provides the 64-bit words to buffers 50.

An example showing space alignment for a 16-bit word is shown in FIGS. 6a and 6b (collectively FIG. 6). The incoming 10 Gb/s data stream 26 is represented by the sequence a0, b0, c0, . . . , p0, a1, and so on. The sixteen letters (a–p) represent 16-bit words, and the number represents the high frequency (e.g., 622 MHz) cycle in which the data ideally should be presented to the data-path inputs 30.

It has been arbitrarily assumed that the high-speed demultiplexers 28 powered-up and began demultiplexing at the fourth or "d" position. Accordingly, bits "d" are provided in the uppermost slot in line 30, as shown in FIG. 6b. There is an equal chance for it to begin at any position (a–p) and the training hardware is able to handle all cases.

In this design, the incoming data is again demultiplexed by circuitry 40 to a lower frequency so it can be operated on by CMOS circuitry. In this specific example, this means that each of the high frequency (e.g., 622 MHz) inputs is demultiplexed into four lower frequency (e.g., 155 MHz) outputs 46. These 4-bit groups are then analyzed by detection and control circuitry 52 to determine where the "a" bits are located. This location is determined by seeking out the unique characteristic in one of the groups. Each of sixty-four bits can then be applied to four parallel 16×16 barrel shifters 48 which performs the actual space alignment. Note that the barrel shift operation has the side effect of introducing a one bit time error on some of the inputs. This time error can be corrected during the time alignment phase.

Time alignment involves the identification and compensation for the fact that individual high-speed demultiplexer outputs 30 can be resolved at the DCR interface at different times. Also, the DCR and demultiplexer can add uncertainty. This means that after serial-to-parallel conversion, the individual groups of bits may not be aligned in time with respect to each other. This time error can be corrected by detecting the location of a known characteristic, e.g., a pattern change or transition, in each group of bits and shifting that group by the appropriate number of bits.

An example showing bit alignment (which also results in 64-bit word alignment) is shown in FIG. 7. Here the space alignment has already been performed. As shown at lines 52, input 15 is behind by one bit, input 14 is ahead by 2 bits, and input 0 is already correct. In order to determine the relative position of the individual inputs, a known, preferably constant, input is applied for sufficient duration to ensure that the pipeline registers are initialized with a known value, followed by a transition in a known time location (relative to the 64-bit word). Once the transition is located for each input, its position in time is used to control the shift register taps used to generate the 4-bit outputs 56.

For this specific circuit, with N=4 and a minimum required EP=6 and EN=2, a EP+EN+1 or 9-bit search window is used to avoid missing the transition. Since this requires a 4-bit deep shift register in order to have the required bits available for output, the hardware can readily implement the more robust EP=7 and EN=4 case with a 12-bit search window. This will then handle up to four bits of data advancement and seven bits of slip.

It is noted that the detection circuitry 52 simply consists of finding the first transition in the detection window. The alignment operation comprises using the detected position to control N (EP+EN+1): 1 multiplexers 58.

In another implementation, the detection and control circuitry 52 can detect the earliest transition (i.e., the first transition in time in one of the input streams). The system will then count four clock cycles so that the transition has been shifted to the right-most register in shift register 50. Based on the assumptions for EP and EN, each of the other data streams will also contain a transition in one of the registers of shift register 50. The detection and control circuitry 50 can then examine the contents of shift registers 50 and provide the time alignment in aligner 58.

The hardware function to perform the 16-bit word alignment operation is shown in FIG. 8 and in FIG. 9. These figures show how the training packet contents are used to perform the M-bit word alignment function. Essentially, an alternating sequence of all 0's or all 1's is sent to each input, with input 0 indicated by a key of two "all 0's" in a row. A detector 64 watches each set of N input registers 44, and indicates whether all N registers contain all "0's" or all "1's." This function can be accomplished by combinational logic as shown in FIG. 9.

As also shown in FIG. 9, training packets are detected by searching for all of the M possible shifted input sequences (but only when each input is simultaneously receiving all "0's" or all "1's"). When a training packet is detected, the pattern that was matched indicates how many positions the barrel shifter 48 should shift by. This is then registered in registers 66 and used to control the barrel shifter 48 until Modified-SDL synchronization is lost and another training packet is detected.

The preceding discussion was based on the code shown in Table 5. As noted earlier, it is also possible to implement the present invention with numerous other codes. One such of those codes is shown in Table 7.

TABLE 7

| M Inputs | Space Error Correction | Time Error Correction |
|---|---|---|
| 0 | 0011 0011 0011 0011 | 0101 0101 0100 |
| 1 | 1010 1010 1010 1010 | 1010 1010 1011 |
| 2 | 0101 0101 0101 0101 | 0101 0101 0100 |
| 3 | 1010 1010 1010 1010 | 1010 1010 1011 |
| 4 | 0101 0101 0101 0101 | 0101 0101 0100 |
| 5 | 1010 1010 1010 1010 | 1010 1010 1011 |
| 6 | 0101 0101 0101 0101 | 0101 0101 0100 |
| 7 | 1010 1010 1010 1010 | 1010 1010 1011 |
| 8 | 0101 0101 0101 0101 | 0101 0101 0100 |
| 9 | 1010 1010 1010 1010 | 1010 1010 1011 |
| 10 | 0101 0101 0101 0101 | 0101 0101 0100 |
| 11 | 1010 1010 1010 1010 | 1010 1010 1011 |
| 12 | 0101 0101 0101 0101 | 0101 0101 0100 |
| 13 | 1010 1010 1010 1010 | 1010 1010 1011 |
| 14 | 0101 0101 0101 0101 | 0101 0101 0100 |
| 15 | 1010 1010 1010 1010 | 1010 1010 1011 |

In this example, the detector circuitry will search for the group of bits with the unique pattern—in this case 0011 (or the shifted variants thereof, e.g., 0110, 1100, 1001). This training sequence provides the advantage that it has a higher bit transition density within each group of bits as well as in the serial combination of the groups. This feature may be important in applications where the clock must be recovered from the lower speed lines. It is noted, however, that this feature comes at the cost of more complicated detection circuitry.

The code of Table 7 also includes second phase for time error correction. In this example, the characteristic that allows the correction is the "00" or "11" at the end of each pattern. As with the space pattern, the time pattern has a higher bit transition density within each group of bits than the code shown in Table 5.

In both Table 5 and Table 7, the space pattern was sixteen bits long and the time pattern was twelve bits long. These bit lengths, however, are not required. Depending on the particular system and the tolerance to aliasing, this bit length can be longer or shorter.

In one embodiment, the present invention can be implemented to perform training in the presence of errors. For example, the detection and control circuitry 52 will examine the training packets. In the previously described embodiments, if a single bit is off, the system will determine that the current packet is not a valid training packet and will stop the training process. In some systems, however, it might not be necessary to be this stringent with the rules. For example, if the system determines that the present sequence would be a training sequence but for a small number of bit errors, then the system might go ahead treat the sequence as training sequence and train anyway. A simple set of rules can be used to make this determination. While this may be computationally arduous, this embodiment would allow training to occur even if there are adverse line conditions. Even if the system were to improperly train by detecting an aliased training packet prior to the arrival of the actual training packet, it would not be able to frame and therefore no additional errors would occur.

The present invention has been described with examples from telecommunications or data communications. It should be understood, however, that the concepts are not limited to those fields. The present invention is applicable in any field where high speed data transfer occurs. These fields might include high speed computing and disk drives. The time error correction can be applied even in situations where no parallel-to-serial or serial-to-parallel conversion takes place.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of distinguishing a plurality of parallel data streams, the method comprising:

receiving n streams of parallel data, n being an integer number greater than one;

searching through the n streams of parallel data to detect a unique characteristic that is possessed by one of the streams of data but not any of the other streams of data; and assigning the one of the streams of data as a particular bit position within n bit positions, each of the other streams of data assigned a different one of the n bit positions.

2. The method of claim 1 wherein the unique characteristic comprises a unique bit pattern within the one stream of data.

3. The method of claim 2 wherein the unique bit pattern comprises a "1100", or a shifted variant thereof and wherein the bit pattern for each of the other streams of data comprise either "1010" or "0101".

4. The method of claim 2 wherein each of the other streams of data includes a unique characteristic such that each stream of data can be distinguished from every other of the n streams of data.

5. The method of claim 1 wherein the unique characteristic comprises a unique relationship between the one stream of data and at least one other stream of data.

6. The method of claim 5 wherein the unique characteristic comprises a unique relationship between the one stream of data and an adjacent stream of data.

7. The method of claim 5 wherein the one stream of data comprises the same sequence of bits as the at least one other stream of data.

8. The method of claim 7 wherein the one stream of data comprises a plurality of bits at the same logical level.

9. The method of claim 1 and further comprising determining whether the n streams of parallel data comprise a training sequence, the determining performed prior to or concurrently with searching through the n streams of parallel data.

10. The method of claim 9 wherein determining whether the n streams of parallel data comprise a training sequence comprises determining that the n streams of data would comprise a valid training sequence but for a small number of bit errors and treating the n streams of data as a training sequence.

11. The method of claim 1 wherein the one of the streams of data is assigned as the least significant bit of data.

12. The method of claim 1 wherein the one of the streams of data is assigned as the most significant bit of data.

13. The method of claim 1 wherein each of the n streams of parallel data is one bit long.

14. A method of correcting time errors in a plurality of parallel data streams, the method comprising:
receiving n streams of parallel data, n being an integer number greater than one, each of the n streams being in a particular pattern;
for each of the n streams of parallel data, detecting a characteristic within the particular pattern; and
re-timing the n streams of parallel data relative to one another, the re-timing being based on the detection of the characteristic.

15. The method of claim 14 wherein the characteristic comprises a pattern change.

16. The method of claim 15 wherein the characteristic comprises a transition from one logical level to another logical level.

17. The method of claim 14 wherein the particular pattern comprises a string of bits at the same logical level and wherein the transition comprises at least one bit at a different logical level.

18. The method of claim 17 wherein the particular pattern comprises a string of logical 1's for some of the streams of parallel data and a string of logical 0's for others of the streams of parallel data.

19. The method of claim 14 wherein each of the n streams of data is x bits long, wherein is a positive integer and x=EP+EN+1, wherein EP is the maximum positive bit error position and EN is the maximum negative bit error position.

20. A method of communicating across a serial line, the method comprising:
providing n parallel streams of data, n being an integer number greater than one, the n parallel streams of data characterized in that one of streams of data includes a unique characteristic that can be used to distinguish that one from each of the other streams of data;
converting the n parallel streams of data into at least one serial stream of data;
transmitting the at least one serial stream of data across at least one serial line;
converting the at least one serial stream of data into m parallel streams of data, m being an integer number greater than one; and
searching for the unique characteristic to determine which of the converted parallel streams of data corresponds to the one stream of data.

21. The method of claim 20 wherein each of the m parallel streams of data includes a portion that is in a particular pattern, the method further comprising:
for each of the m streams of parallel data, detecting a transition in the particular pattern; and
re-timing the m streams of parallel data relative to one another, the re-timing being based on the detection of the transition.

22. The method of claim 20 wherein the unique characteristic comprises a unique bit pattern within the one stream of data.

23. The method of claim 22 wherein the unique characteristic comprises a unique relationship between the one stream of data and at least one other stream of data.

24. The method of claim 20 where m=n.

25. The method of claim 20 wherein the at least one serial stream of data comprises only one serial stream of data and wherein the at least one serial link comprises only one serial link.

26. A method of correcting time errors in a plurality of parallel data streams, the method comprising:
providing n parallel streams of data, n being an integer number greater than one, each of the n streams being in a particular pattern that includes a detectable characteristic;
converting the n parallel streams of data into at least one serial stream of data;
transmitting the at least one serial stream of data across at least one serial line;
converting the at least one serial stream of data into m parallel streams of data, m being an integer number greater than one;
for each of the m streams of parallel data, detecting a characteristic within the particular pattern; and
re-timing the m streams of parallel data relative to one another, the re-timing being based on the detection of the characteristic.

27. The method of claim 26 wherein the characteristic comprises a pattern change.

28. The method of claim 27 wherein the characteristic comprises a transition from one logical level to another logical level.

29. The method of claim 26 wherein m=n.

30. The method of claim 26 wherein the method corrects time errors generated during the step of converting the n parallel streams of data into at least one serial stream of data or the step of transmitting the at least one serial stream of data across at least one serial line.

31. The method of claim 26 wherein the method corrects time errors generated during the step of converting the at least one serial stream of data into m parallel streams of data.

32. A circuit comprising:
a serial to parallel converter with at least one serial input and n parallel outputs, n being an integer number greater than one;
a detector circuit with n inputs, each of the n detector inputs coupled to a respective one of the n parallel outputs, the detector circuit including circuitry to analyze data from the serial-to-parallel converter and detect a unique characteristic that is possessed by data carried by one of the n parallel outputs but not any of the other parallel outputs; and
word alignment circuitry with n data inputs and at least one control input, each of the data inputs coupled to a respective one of the n parallel outputs and the at least one control input coupled to the detector circuit.

33. The circuit of claim 32 wherein the at least one serial input comprises m serial inputs, the circuit further comprising a second serial-to-parallel converter, the second serial-to-parallel receiving a serial input and providing m parallel outputs to the m serial inputs of the serial-to-parallel converter.

34. The circuit of claim 32 and further comprising a digital clock recovery circuit coupled to the serial-to-parallel converter.

35. The circuit of claim 32 wherein the word alignment circuitry comprises a barrel shifter.

36. The circuit of claim 32 wherein the serial-to-parallel converter, the detector circuit and the word alignment circuitry are all disposed on a single integrated circuit chip.

37. A circuit comprising:

means for converting at least one serial input to n parallel outputs;

means for detecting a unique characteristic that is possessed by data carried by one of the n parallel outputs but not any of the other parallel outputs; and means for re-aligning the n parallel outputs based on the unique characteristic.

38. A circuit comprising:

at least one shift register including n parallel inputs and n parallel outputs, wherein n is an integer number greater than one;

a detector circuit coupled to the at least one shift register, the detector circuit coupled to examine data stored in the at least one shift register and detect a transition within said data; and alignment circuitry coupled to the shift register, the alignment circuitry causing the data within the shift register to be re-timed based on the detection of the transition.

39. The circuit of claim 38 wherein the alignment circuitry includes n parallel inputs each of which is coupled to one of the n parallel outputs of the at least one shift register, the alignment circuitry further including at least one control input coupled to the detector circuit.

40. The circuit of claim 38 wherein the at least one shift register comprises a plurality of shift registers.

41. The circuit of claim 40 wherein the at least one shift register comprises a plurality of 4×4-bit shift registers.

42. The circuit of claim 38 and further comprising:

a serial to parallel converter with at least one serial input and n parallel outputs;

a second detector circuit with n inputs, each of the n detector inputs coupled to a respective one of the n parallel outputs, the detector circuit including circuitry to analyze data from the serial-to-parallel converter and detect a unique characteristic that is possessed by data carried by one of the n parallel outputs but not any of the other parallel outputs; and word alignment circuitry with n data inputs and at least one control input, each of the data inputs coupled to a respective one of the n parallel outputs and the at least one control input coupled to the detector circuit, the word alignment circuitry further comprising n outputs each of which is coupled to a respective one of the n parallel inputs of the at least one shift register.

43. The circuit of claim 42 wherein the second detector circuit shares common circuit elements with the detector circuit.

* * * * *